(12) United States Patent
Earhart et al.

(10) Patent No.: US 10,732,895 B2
(45) Date of Patent: Aug. 4, 2020

(54) DRIVE-LEVEL INTERNAL QUALITY OF SERVICE

(71) Applicant: Burlywood, LLC, Longmont, CO (US)

(72) Inventors: Tod Earhart, Longmont, CO (US); David Christopher Pruett, Longmont, CA (US)

(73) Assignee: Burlywood, Inc., Longmont, CO (US)

( * ) Notice: Subject to any disclaimer, the term of this patent is extended or adjusted under 35 U.S.C. 154(b) by 27 days.

(21) Appl. No.: 15/927,500

(22) Filed: Mar. 21, 2018

(65) Prior Publication Data

US 2018/0275923 A1  Sep. 27, 2018

Related U.S. Application Data

(60) Provisional application No. 62/474,718, filed on Mar. 22, 2017.

(51) Int. Cl.
*G06F 3/06* (2006.01)

(52) U.S. Cl.
CPC .......... *G06F 3/0659* (2013.01); *G06F 3/0604* (2013.01); *G06F 3/0611* (2013.01); *G06F 3/0613* (2013.01); *G06F 3/0631* (2013.01); *G06F 3/0653* (2013.01); *G06F 3/0679* (2013.01)

(58) Field of Classification Search
CPC ... G06F 3/0658; G06F 3/0659; G06F 13/1642
See application file for complete search history.

(56) References Cited

U.S. PATENT DOCUMENTS

| | | | | |
|---|---|---|---|---|
| 6,895,485 | B1* | 5/2005 | DeKoning | G06F 3/0605 711/114 |
| 2003/0079080 | A1* | 4/2003 | DeMoney | G06F 3/061 711/112 |
| 2004/0194095 | A1* | 9/2004 | Lumb | G06F 9/4887 718/100 |
| 2005/0050270 | A1 | 3/2005 | Horn et al. | |
| 2008/0162735 | A1 | 7/2008 | Voigt et al. | |
| 2009/0225762 | A1 | 9/2009 | Davidson et al. | |
| 2011/0010427 | A1* | 1/2011 | Jnagal | G06F 3/0605 709/213 |
| 2012/0072679 | A1* | 3/2012 | Biswas | G06F 13/1626 711/154 |
| 2012/0203986 | A1 | 8/2012 | Strasser et al. | |

(Continued)

*Primary Examiner* — Nathan Sadler

(57) ABSTRACT

A storage controller is provided. The storage controller includes a host interface, a drive interface, and a quality of service control module coupled with the host interface and the drive interface. The QoS module includes read and write queues for each data stream, each queue associated with corresponding token buckets, and an arbiter, configured to receive requests from the read and write queues, and to service the read and write queues in an order at least partially determined by a quantity of tokens in each token bucket. The QoS module also includes a quality of service measurement module, configured to measure quality of service levels for each of the read and write queues, and a bandwidth allocation manager, configured to allocate tokens to each token bucket at a rate corresponding to the service level agreements and the measured quality of service level for each of the read and write queues.

20 Claims, 6 Drawing Sheets

(56) References Cited

U.S. PATENT DOCUMENTS

| | | | |
|---|---|---|---|
| 2013/0054901 A1* | 2/2013 | Biswas | G06F 13/1642 |
| | | | 711/154 |
| 2013/0298123 A1 | 11/2013 | Zuo et al. | |
| 2014/0325522 A1* | 10/2014 | Li | G06F 3/061 |
| | | | 718/104 |
| 2015/0178015 A1* | 6/2015 | Povzner | G06F 3/0653 |
| | | | 710/18 |
| 2015/0293709 A1* | 10/2015 | Quach | G06F 13/1605 |
| | | | 711/105 |
| 2016/0011935 A1 | 1/2016 | Luby | |
| 2016/0274970 A1 | 9/2016 | Earhart | |
| 2016/0283308 A1 | 9/2016 | Earhart | |
| 2016/0291885 A1 | 10/2016 | Pendharkar et al. | |
| 2016/0299697 A1* | 10/2016 | Chen | G06F 3/0611 |
| 2018/0103098 A1* | 4/2018 | Oelke | H04L 67/1097 |

* cited by examiner

DRIVE-LEVEL INTERNAL QUALITY OF SERVICE

RELATED APPLICATIONS

This application hereby claims the benefit of and priority to U.S. Provisional Patent Application No. 62/474,718, titled "DRIVE-LEVEL INTERNAL QOS", filed on Mar. 22, 2017 and which is hereby incorporated by reference in its entirety.

TECHNICAL FIELD

Aspects of the disclosure are related to data storage and in particular to applying different Quality of Service (QoS) levels to different data streams within a single storage device.

TECHNICAL BACKGROUND

Large storage systems such as data centers and cloud storage providers typically store and retrieve large quantities of data for multiple different customers and applications. Different applications and different customers may have different requirements for how quickly their data is stored or retrieved. These requirements typically are in the form of Service Level Agreements (SLAs) between the customer and the storage provider. Service Level Agreements typically define a minimum Quality of Service (QoS) for any particular customer, application, or individual data stream.

The Quality of Service comprises the performance properties for data reads and writes. For isolated write or read traffic, the parameters are latency and throughput. For mixed workloads, it is measured in Input/Output Operations per Second (IOPS).

Data networks use SLAs and QoS to provide a known, measured, and guaranteed level of service when handling multiple traffic streams. Data centers and cloud service providers may also benefit by applying SLAs and QoS to additional types of shared resources such as computing power using virtual servers and shared storage using multiple large storage devices and arrays.

Service Level Agreements for data networks typically include delay, jitter, and packet loss metrics on a per connection basis. This translates into a bandwidth and latency allocation per connection through the routers in the path. SLAs for storage devices include bandwidth, latency, and IOPS for write, read, and mixed write/read traffic.

In order to maintain acceptable service levels for shared customers, it is necessary to measure the performance to ensure that it is always acceptable. The method of performance measurement is QoS. By measuring QoS, service providers can ensure that customers receive adequate service and determine if and when their infrastructure may need to be upgraded to maintain desired service levels.

Newer data center and cloud services infrastructures are relying more and more on virtualized services. These data centers have large server farms. The servers run multiple Virtual Machines (VMs). A VM has data storage allocated to it. The data storage can be in many forms from local (high speed RAM, Local Bus NV Storage—usually PCIe SSD, local HDD) to remotely shared over a LAN or SAN (All Flash Array, Hybrid Flash & HDD, HDD Array).

In this environment, an application or user is allocated network bandwidth, processor bandwidth, and storage size. Until recently, with the advent of higher speed non-volatile memory such as flash, the storage bandwidth was not that important due to the large mismatch in performance between CPU and HDD bandwidth. High speed applications required more local cache.

Having an infrastructure that is capable of provisioning resources at different SLAs that are continuously measured against their QoS parameters is becoming very important in newer data center and cloud services architectures that support multi-tenant shared storage.

With the large variation in storage performance and cost that now exists, it is desirable to assign an SLA to the storage portion of the services.

All Flash Array (AFA) systems provide QoS and SLA features. These are normally provisioned at the array ingress across host IDs. Within a host ID, they can be further provisioned via namespaces and Logical Block Addressing (LBA) ranges associated to specific Virtual Machines (VMs), containers, and applications.

AFAs are able to segregate the user traffic and manage the traffic to meet SLA goals as long as the bandwidth and latency is well under-subscribed. AFAs cannot deterministically meet SLA goals in near full or over-subscribed situations due to their use of Solid State Drives (SSDs).

SSDs require background operations such as garbage collection, wear leveling, and scrubbing that make their performance and latencies indeterminate. Attempts have been made to reduce these effects by having the host regulate the amount of background activities allowed in the SSD. However, if a system is reaching capacity and performance limits, the SSD must perform background tasks in order to free up space—which eliminates the determinism at the worst possible time.

There are many other use models that suffer from SSD performance variations. Any high-performance application that depends on consistent SSD storage performance has this issue. Also, any system that has multiple applications, VMs, and/or hosts sharing the same storage has this problem.

Overview

In an embodiment, a storage controller for a storage system is provided. The storage controller includes a host interface, configured to receive and transmit multiple data streams, each data stream having a corresponding service level agreement measured by a corresponding quality of service, a drive interface, configured to transmit the data streams to storage media, and a quality of service control module coupled with the host interface and the drive interface.

The quality of service control module includes a read queue for each of the data streams, each read queue associated with a corresponding token bucket, a write queue for each of the data streams, each write queue associated with a corresponding token bucket, and an arbiter, configured to receive requests from the read and write queues, and to service the read and write queues in an order at least partially determined by a quantity of tokens in each token bucket.

The quality of service control module also includes a quality of service measurement module, configured to measure quality of service levels for each of the read and write queues, and a bandwidth allocation manager, configured to allocate tokens to each token bucket at a rate corresponding to the service level agreements and the measured quality of service level for each of the read and write queues.

In another embodiment, a method of operating a storage controller, configured to receive and transmit multiple data streams, each data stream having a corresponding service level agreement measured by a corresponding quality of service, is provided. The method includes receiving requests from multiple read and write queues corresponding to the multiple data streams, each queue including a token bucket, and servicing the requests from the read and write queues in an order at least partially determined by a quantity of tokens in each token bucket.

The method also includes measuring quality of service levels for each of the read and write queues, and allocating tokens to each token bucket at a rate corresponding to the service level agreements and the measured quality of service level for each of the read and write queues.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
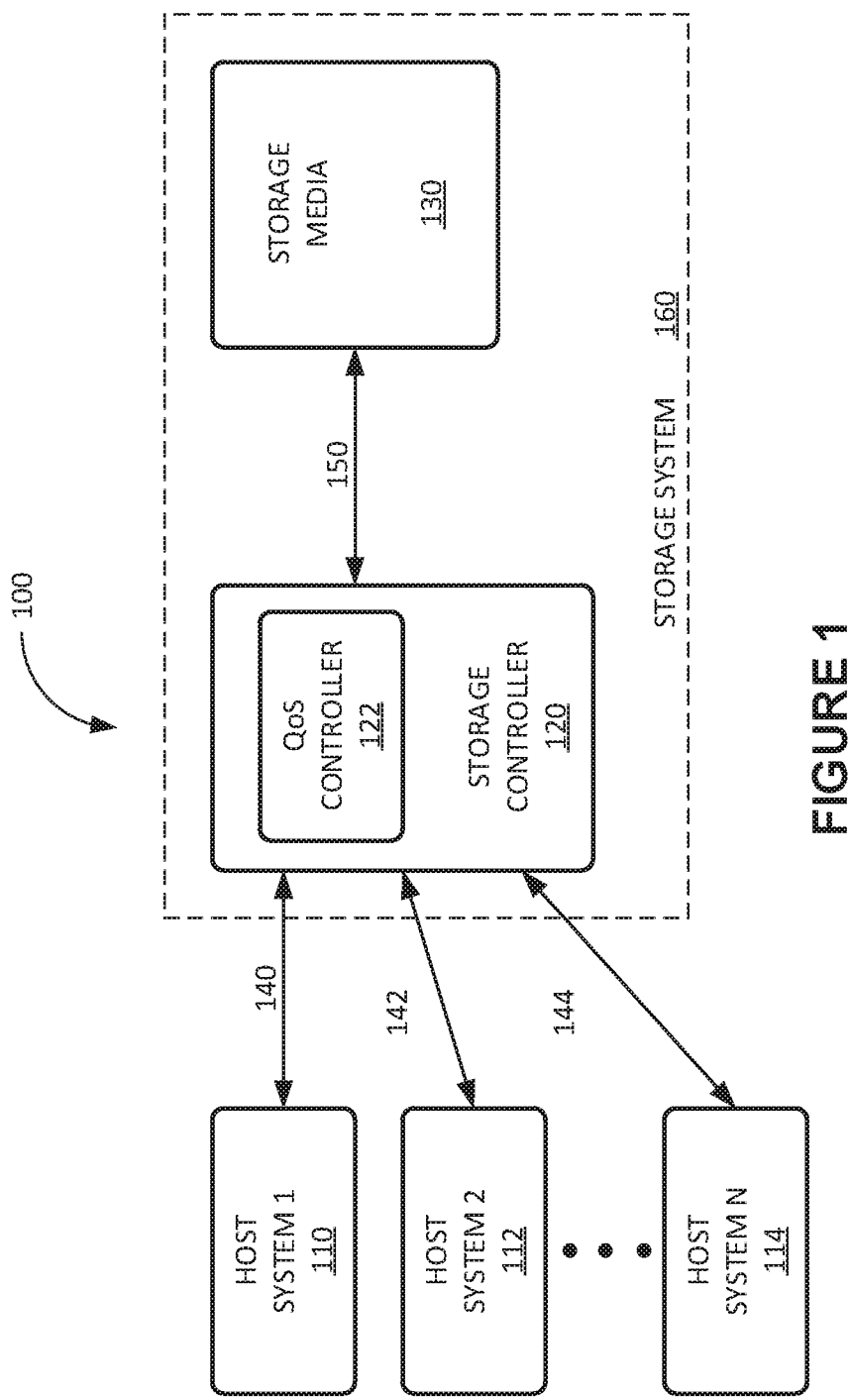
FIG. 1 illustrates a computer host and data storage system.

FIG. 1 illustrates computer host and data storage system 100. In this example embodiment, host system 1 110, host system 2 112, through host system N 114 send data to, and receive data from, storage controller 120 for storage in storage media 130. In an example embodiment, each host system may be owned or controlled by a different customer or application. Storage controller 120 communicates with storage media 130 over link 150 and QoS controller 122 within storage controller 120 performs the function of maintaining Service Level Agreements for each data stream received from the host systems while transferring the data to or from storage media 130. Together storage controller 120 and storage media 130 make up storage system 160.

Storage controller 120 (including QoS controller 122) is configured to provide QoS measurement and SLA control within storage system 160 while supporting multiple, simultaneous storage media 130 access processes. It enables storage system 160 to provide consistent performance across one or more data streams from host systems 110-114 based on defined SLA contracts for each data stream. These SLA contracts may be specified by both bandwidth and latency.

Bandwidth specifications may have a minimum bandwidth requirement and/or a maximum bandwidth requirement. Typically, bandwidth specifications have separate read and write bandwidth requirements. Latency specifications may have a fixed latency, consistent latency, minimum latency, or no requirement. Latency specifications also have separate read and write latency requirements.

When determining overall available bandwidth and latency for storage system 160, the capabilities and requirements of storage media 130 and storage controller 120 must be accounted for. For example, some types of storage media 130 also have overhead requirements such as garbage collection, wear leveling, and scrubbing that make their performance and latencies indeterminate. These overhead requirements must be accounted for when creating SLAs for the data streams to be supported by storage system 160.

In summary, typical SLA agreements include four requirements: write bandwidth (maximum and/or minimum), write latency (fixed, consistent, or minimum), read bandwidth, and read latency.

Storage controller 120 may take any of a variety of configurations. In some examples, storage controller 120 may be a Field Programmable Gate Array (FPGA) with software, software with a memory buffer, an Application Specific Integrated Circuit (ASIC) designed to be included in a single module with storage media 130 (such as storage system 160), a set of Hardware Description Language (HDL) commands, such as Verilog or System Verilog, used to create an ASIC, a separate module from storage media 130, or any of many other possible configurations.

Host systems 110-114 communicate with storage controller 120 over various communication links, such as communication links 140, 142, and 144. These communication links may use the Internet or other global communication networks. Each communication link may comprise one or more wireless links that can each further include Long Term Evolution (LTE), Global System for Mobile Communications (GSM), Code Division Multiple Access (CDMA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. These communication links can carry any communication protocol suitable for wireless communications, such as Internet Protocol (IP) or Ethernet.

Additionally, communication links can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Communication links can each use metal, glass, optical, air, space, or some other material as the transport media. Communication links may each be a direct link, or may include intermediate networks, systems, or devices, and may include a logical network link transported over multiple physical links. Common storage links include SAS, SATA, NVMe, Ethernet, Fiber Channel, Infiniband, and the like.

Storage controller 120 communicates with storage media 130 over link 150. Link 150 may be any interface to a storage device or array. In one example, storage media 130 comprises NAND flash memory and link 150 may use the Open NAND Flash Interface (ONFI) command protocol, or the "Toggle" command protocol to communicate between storage controller 120 and storage media 130. Other embodiments may use other types of memory and other command protocols. Other common low level storage interfaces include DRAM memory bus, SRAM memory bus, and SPI.

Link 150 can also be a higher level storage interface such as SAS, SATA, PCIe, Ethernet, Fiber Channel, Infiniband, and the like. However—in these cases, storage controller 120 would reside in storage system 160 as it has its own controller.

Figure 2:
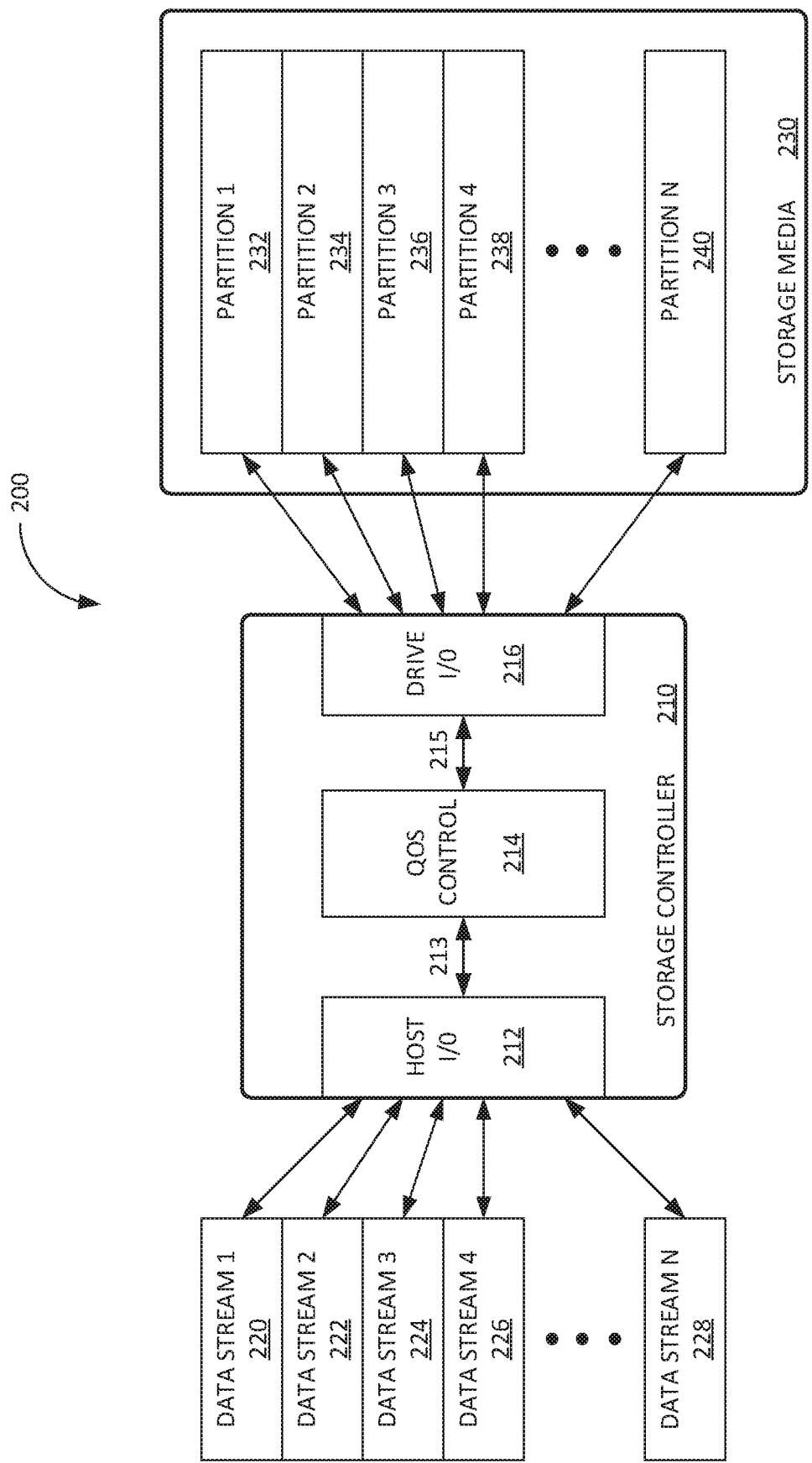
FIG. 2 illustrates a storage controller and storage media within a data storage system.

FIG. 2 illustrates a storage controller 210 and storage media 230 within a data storage system 200. In this example embodiment, storage controller 210 (similar to storage controller 120 from FIG. 1) and storage media 230 (similar to storage media 130 from FIG. 1) together comprise a storage system.

Storage controller 210 is configured to receive a plurality of data streams 220-228 from a plurality of host systems (such as host systems 1-N 110-114 from FIG. 1) through host I/O 212. Each data stream may have a different SLA and a corresponding QoS requirement. QoS controller 214 measures the QoS of each data stream 220-228 and ensures that the SLA for each data stream 220-228 is met. Drive I/O 216 communicates with storage media 230. In this example embodiment, storage media 230 comprises a plurality of partitions 232-240. In some embodiments, each partition may correspond to a particular data stream, thus compartmentalizing the data for each data stream.

QoS controller 214 is independent of storage media type. It works with any storage media 230 that is capable of supporting multiple, concurrent operations. Many media types, such as flash memory, require internally generated media accesses in addition to the media access requested directly by the host I/O interface 212. These overhead media accesses are also governed by SLAs and are required to maintain control of the overall system bandwidths and latencies.

Some examples of internal processes that generate media accesses include garbage collection, scrubbing, erase, and data migration. QoS controller 214 manages these media access processes in addition to the data streams to ensure that the data streams meet the requirements of their SLAs.

In order to allocate SLAs to the various data streams 220-228, first a maximum allocation threshold and a maximum user allocation threshold must be determined based on the physical capabilities of storage controller 210 and storage media 230. Each partition 232-240 that is created within storage media 230 requires an allocation of bandwidth and latency. As each partition is created, an allocation request is sent to QoS controller 214.

In an example embodiment, storage media 230, such as a flash memory array, is partitioned into multiple, physically separate storage areas that are assigned to each process. These separate storage areas are called partitions. Each partition has multiple attributes including an SLA.

If QoS controller 214 received an allocation request for more bandwidth and/or latency than remains for the system, the allocation is controlled by several parameters. In some embodiments, no over provisioning of bandwidth is allowed, and the allocation request for the partition is rejected. In other embodiments, QoS controller 214 may allow the partition to be created; but sends a warning to the user. In this case QoS controller 214 may set the bandwidth for the partition to the maximum amount remaining for the system; or may reduce bandwidths on all of the partitions within storage media 230 to make room for the new partition.

Typical allocation request parameters include read latency, read bandwidth, write latency, and write bandwidth. Each parameter may comprise a variety of settings and limits.

Read latency is measured as the time to first data after a command is issued on a partition that is idle. Read latency settings are typically provided in microseconds and include: minimum (best effort), fixed (specifies a latency that the device will pace to), and maximum (based on statistics of the storage media).

The storage system has a worst case and a typical value for read latency for each partition when the system is not idle on the other partitions. If a user attempts to set latencies that are faster than the typical and/or worst case, QoS controller 214 returns a warning, and sets the latency to the minimum/best effort. The storage system also has a best case value when the system is idle. This lowest latency may be used for metadata partitions in emergency shut down situations.

Read bandwidth is measured with normal expected traffic in all partitions. Read bandwidth settings are typically provided in megabytes per second and include: maximum (best effort), value (target minimum bandwidth), and fixed.

The storage system has a total bandwidth that includes overhead for internal operations. When a fixed bandwidth is specified, the data will be returned at the specified rate. When a value bandwidth is specified, QoS controller 214 targets a minimum bandwidth which is guaranteed, but typically is exceeded. If read bandwidth is oversubscribed, QoS controller 214 returns an error or warning.

Write latency is measured as time to first data stored in storage media 230 after a command is issued on a partition that is idle. Write latency settings are typically provided in microseconds and include: non-cached, cached, maximum, and fixed.

Service Level Agreements typically comprise: minimum write bandwidth, minimum read bandwidth, maximum write latency, maximum read latency, and minimum mixed traffic IOPS.

Service Level Agreements are provided for each group of related storage media transactions that need to have a defined SLA. Data streams may have either single or multiple sources. Data stream sources may be internal processes or received through host I/O interface 212 or drive I/O interface 216. Note that not all storage media transactions require a SLA controlled data stream.

Data stream Service Level Agreement parameters typically include: minimum write bandwidth, maximum write bandwidth, maximum write latency, minimum read bandwidth, maximum read bandwidth, and maximum read latency. Data streams may include user data from one or more specific sources, garbage collection within storage media 230, and the like.

The total read and write bandwidths for storage media 230 are defined or calculated independently. The total storage media 230 bandwidth is a combination of the read and write bandwidths but is allocated separately for each data stream or process.

Data streams may have a minimum and/or a maximum bandwidth allocation. If a data stream only has a minimum bandwidth allocation QoS controller 214 ensures that the data stream gets the minimum allocated bandwidth, and if there is excess bandwidth available, the data stream may get some or all of the excess bandwidth.

If a data stream only has a maximum bandwidth allocation QoS controller 214 throttles the data stream to the maximum bandwidth. If a data stream has both minimum and maximum bandwidth allocations QoS controller 214 allocates the bandwidth and throttles the data stream through bursts. During actual operation, actual bandwidth is regularly measured and compared against the allocation for each data stream.

Latency is defined for each data stream or process. It may be defined as best, consistent, or fixed. A data stream may have a maximum latency, in which case the data stream will be given priority in order to meet the maximum latency. However, if there are a many data streams each having a maximum latency the streams will compete for priority, so it is best to limit the number of data streams having a maximum latency.

For high bandwidth and/or low latency data streams, storage media 230 may need to be configured to a different memory type, and the task priorities and bandwidth assigned to the data streams may be adjusted. In some embodiments, QoS controller includes a latency pacer working to achieve consistent or fixed latency.

Processes that generate storage data traffic can be both external or internal to the storage system. Some examples of internal processes include: internal translation table updates stored to media, garbage collection and wear leveling, and scrubbing.

Garbage collection is the process of eliminating obsolete data in the media to free up space for new written data. This process is needed in storage systems where the write size to media differs from the unit write size used by the host. Scrubbing is a process that reads existing data and relocates it to fresh media if there is any risk of degradation in the data or the area it is currently written to.

In some embodiments, storage media 230 comprises a flash memory array. In these embodiments a flash interface router sits between all the flash interface instances and components in the flash manager that might issue flash interface requests. It performs the following functions: routes requests to the appropriate flash interface instance, implements elastic buffers for each requester so the requesters have a simple, non-blocking interface to submit requests, and performs arbitration to among the various requesters to implement guaranteed levels of service per partition.

Figure 3:
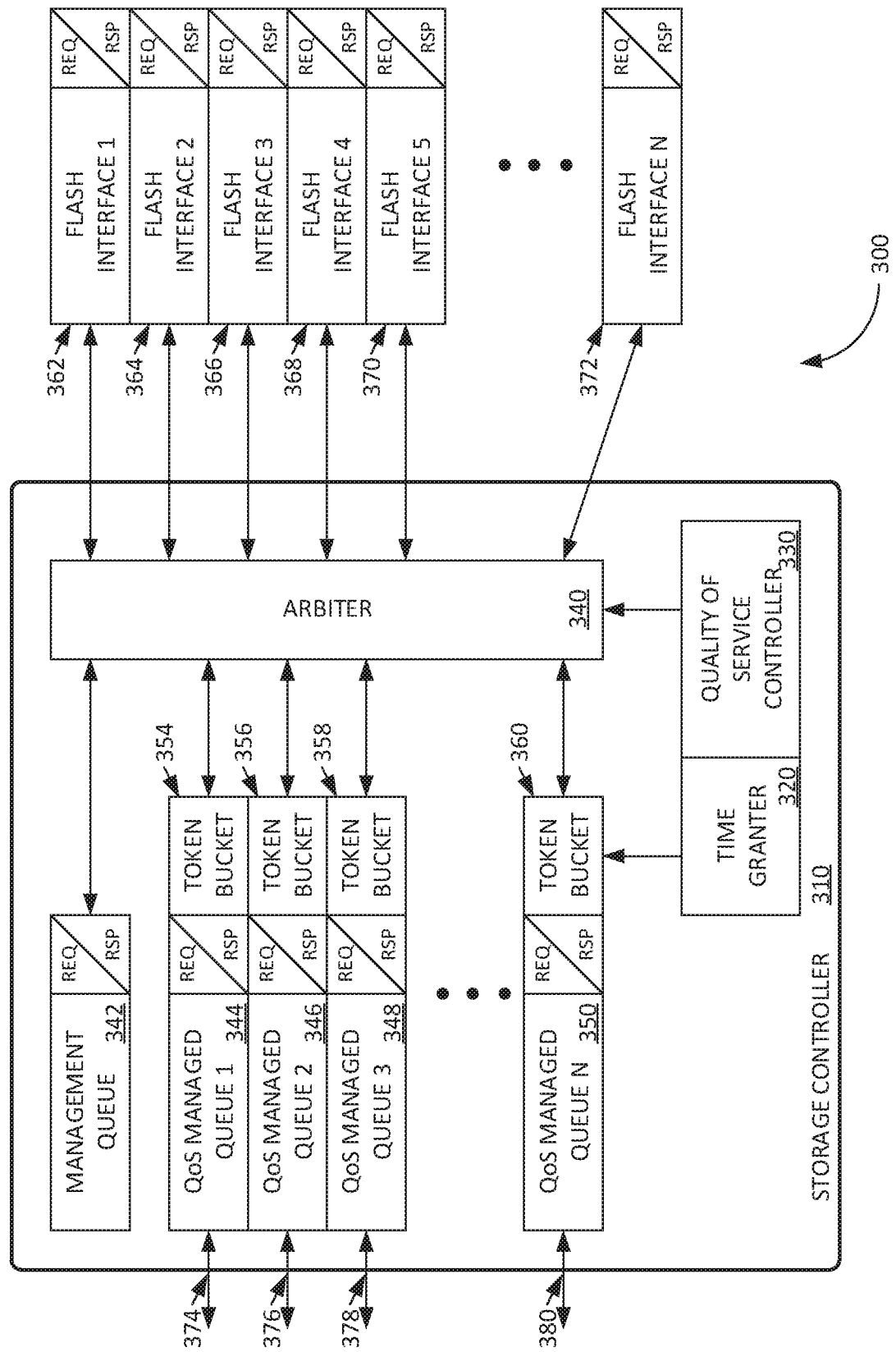
FIG. 3 illustrates a storage controller for flash memory within a storage system.

FIG. 3 illustrates a storage controller 310 for flash memory within a storage system 300. In this example embodiment storage controller 310 received a plurality of data streams 374-380 from a plurality of host machines. Storage controller 310 is configured to operate with a flash memory array through a plurality of flash interfaces 362-372.

QoS controller 330 attempts to ensure a defined level of performance for each partition in storage media 230 (such as a flash memory array). This involves defining a set of performance parameters and the minimum and/or maximum value for each of the parameters. This definition is referred to as the Service Level Agreement (SLA). A Virtual Drive (flash memory array) may request an SLA for each partition. Storage controller 310 agrees to the SLA if, in its evaluation, the SLA is achievable and warns the user if not. Once agreed upon, storage controller 310 monitors the metrics and performs traffic shaping to ensure that all SLAs are met. Table 1 enumerates some properties of an SLA.

TABLE 1

Service Level Agreement Properties

| Property | Units |
| --- | --- |
| Minimum read bandwidth | bytes/second |
| Minimum write bandwidth | bytes/second |
| Maximum write latency | seconds |
| Non-conforming requests allowed | True/False |

Not all of these properties need to be specified by the SLA. A partition may not even have an SLA. Any request that is not constrained by an SLA shall have no performance guarantee and is considered "best effort".

Token buckets 354-360 are used to manage traffic. In general, tokens are defined to represent some constrained resource, such as time or bytes. Tokens are added to a bucket at a rate 'r.' The bucket has a maximum capacity of 'b' tokens. Once full, no further tokens may be added to the bucket. When the owner of a bucket performs an operation the appropriate number of tokens for the operation are removed from the bucket. When the bucket owner makes a request to perform an operation and it has sufficient tokens in its bucket, the request is deemed conforming. When it lacks sufficient tokens, its request is deemed nonconforming. Conforming requests are always treated with higher priority than nonconforming requests.

Storage controller 310 includes management queue 342 and one or more QoS-managed queues 344-350. Each QoS-managed queue 344-350 includes one or more token buckets 354-360, depending on the details of that queue's SLA.

In an example embodiment, tokens represent time, in seconds. Tokens are distributed by the time granter 320 to each queue according to the properties of the corresponding SLA. Requests are submitted to arbiter 340 which forwards granted requests to the appropriate flash interface 362-372.

The rate at which tokens are distributed to each bucket is determined by the SLA properties applicable to that queue. When converting from bytes/second to tokens, time granter 320 uses the time to read or write a typical page in the array. The eraser's SLA guarantees it a percentage of the overall array bandwidth proportional to the guaranteed write bandwidth to ensure that erased blocks are always available.

The sum total of all of the SLA properties must not over-commit the total bandwidth available in the flash memory array, including overhead and housekeeping requirements. Requirements for writing, reading, and erasing each queue may be expressed as:

$$r_{wi} = SLA_{wi} \left\{ \frac{bytes/page}{seconds/page\ write} \right\}_{avg}^{-1}$$

$$r_{ri} = SLA_{ri} \left\{ \frac{bytes/page}{seconds/page\ read} \right\}_{avg}^{-1}$$

$$r_{erase} = \left\{ \sum_{i=1}^{N} SLA_{wi} \right\} \left\{ \frac{bytes/block}{seconds/block\ erase} \right\}_{avg}^{-1}$$

Since the sum total of all of the SLA properties must not over-commit the total bandwidth available in the array, $R_{total}$, the following equation is used to guarantee that $R_{total}$ is never exceeded:

$$\sum_{i=1}^{N} r_{wi} + \sum_{i=1}^{N} r_{ri} + r_{erase} \leq r_{total}$$

Bucket size is chosen to limit bursts of activity after a period of inactivity where tokens could accumulate. When a queue owner submits a command to arbiter 340, the time required for that command is estimated. Note that this may differ from the average operation times used by time granter 320. This time is used when arbiter 340 evaluates requests.

Each flash interface 362-372 estimates the time it would require to complete all commands in its queue. When there are maximum latency SLAs in effect, arbiter 340 avoids issuing commands to an interface 362-372 that is close to or over the maximum latency. This attempts to enforce the maximum latency for command issued to an idle partition, imposed by commands intended for other partitions. It cannot guarantee the latency for commands in a deeply-queued sequence of commands to a single partition.

Arbiter 340 considers the estimated time required for a request, the number of tokens in the requester's bucket, the age of the request, and other concurrent requests. Arbiter 340 will first grant a conforming request from the least-recently-granted requester unless the destination flash interface's 362-372 queue completion time would exceed the latency limit. If there are no grantable conforming requests the arbiter then grants a non-conforming request from the least-recently-granted requester, provided the interface latency limit is not exceeded.

Figure 4:
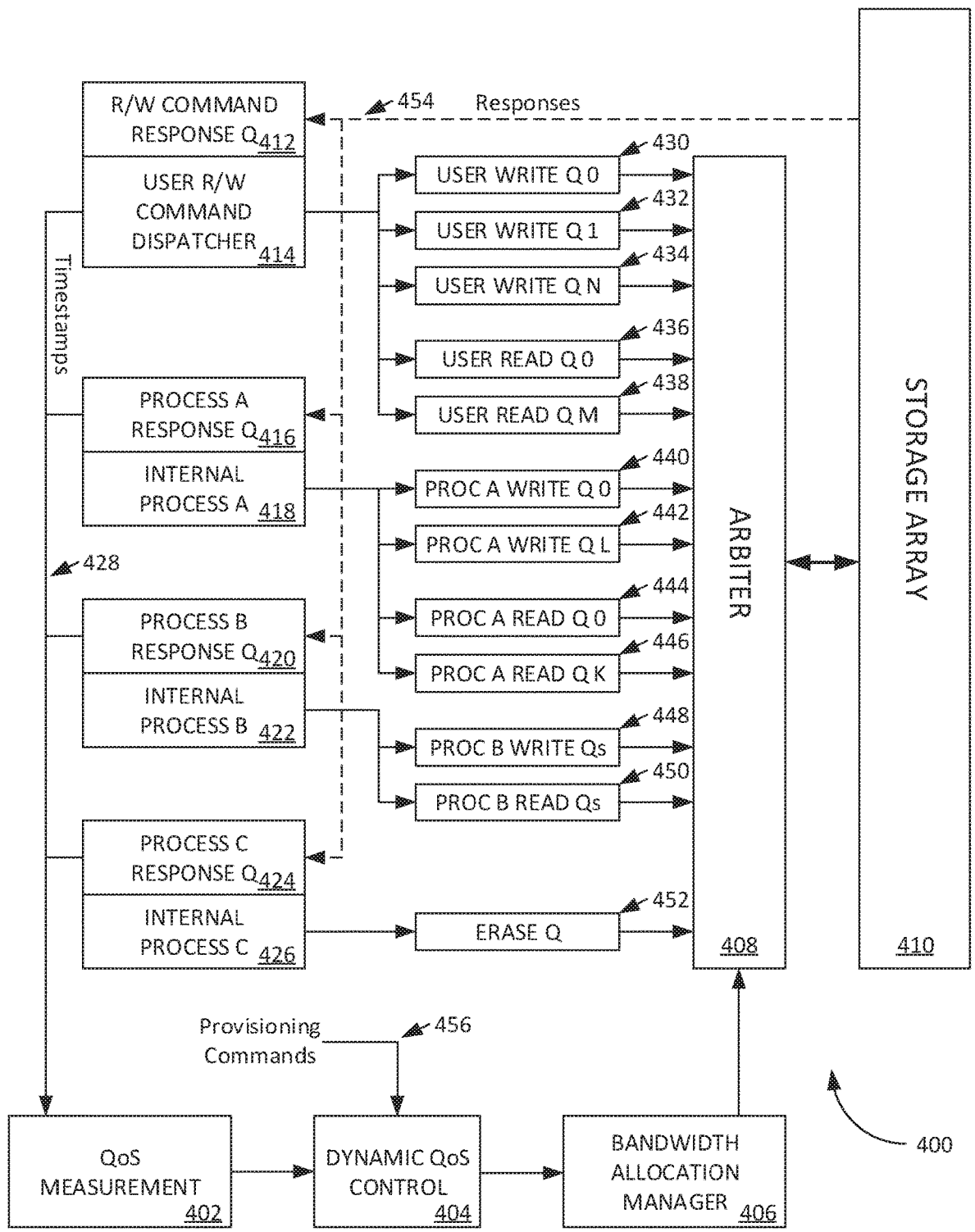
FIG. 4 illustrates a Quality of Service controller within a storage controller.

FIG. 4 illustrates a quality of service controller within a storage controller 400. Within storage controller 400, the quality of service functionality is implemented via two high level mechanisms: software process management, and stream router/arbiter.

In this example embodiment, three internal processes are illustrated as internal process A module 418, internal process B module 422, and internal process C module 426. Each of these modules is associated with a respective response queue: process A response queue 416, process B response queue 420, and process C response queue 424. These response queues store responses 454 received from storage array 410 for transfer to QoS measurement module 402.

In normal operation, there are multiple process types generating read and write commands to the array.

The user read/write command dispatcher 414 receives read and write commands from a host. When it receives a read or write request, it determines what user stream the request is associated with. It then creates an internal media write or read request and deposits it in the write or read queue configured for that data stream.

The user read/write command dispatcher 414 runs at a high priority since all user traffic is routed through it. This is required to handle low latency streams. The read/write command response queue 412 receives responses 454 from storage array 410 and transfers them to QoS measurement module 402.

There may also be multiple internal processes 418, 422, and 426 that generate media access requests. These processes run at a lower priority since they do not handle low latency user traffic. The overall provisioning and task management controls must ensure that these processes get enough processor bandwidth to keep up with their tasks. If this is not met, then the SLA may be violated.

The storage array 410 completes the requests and returns a response 454 for each request to the requesting process.

Each media command is given a creation timestamp 428 when it is generated by a process. When the request is returned to the process's response queue, a completion timestamp 428 is generated. These timestamps are used by QoS measurement module 402 to monitor QoS and detect violations.

Each media access command type and stream is assigned a request queue 430-452. This includes writes, reads, and erases in the case of flash. Arbiter 408 takes requests from these queues and forwards them to storage array 410 for execution. The arbitration algorithm in the stream router enforces the QoS.

QoS measurement module 402 receives the timestamp 428 results from all of the transactions. It calculates read bandwidth, read latency, write bandwidth, write latency, and IOPS. The amount of time for averaging the bandwidth calculations is selectable based on the system performance and traffic.

The IOPS calculation is the number of I/O transactions per second. The averaging time is also selectable. The IOPS calculation can be for separate read and write or mixed. The I/O size per transaction may be different per stream.

The QoS measurement statistics are compared against the provisioned SLA for each data stream. If a violation is detected, a warning is generated. Warnings can be sent back to the host to allow the host to take corrective action. The warning severity is system dependent. Typically, the storage device will not stop operation when QoS violations occur.

For reads, one or more request queues may be combined in a bandwidth measurement.

QoS measurement module 402 compares bandwidth measurements with provisioned values. If the measured bandwidth is lower than the provisioned value, a message is generated. The message may be configured to be a warning or an alarm depending on system requirements. If there isn't enough traffic to fill the available bandwidth, there is no warning.

The latency for both read and write commands is measured on a per-command basis. The latency is provisioned with a range target. All commands with latency measurements outside of the target range produce a message, warning, or alarm.

Each operation is timed at several points: when it is queued, when it is active, when it completes, and when it is retired from the queue. These timestamps are provided to QoS measurement module 402 to ensure that all applicable SLAs are being met.

Dynamic QoS control module 404 receives provisioning commands 456 and is responsible for queue management and prioritization. Dynamic QoS control module 404 is able to assign memory resources as necessary to meet SLAs. It is also responsible for post processing of operational statistics for completed commands, and for statistics on current performance and reporting of violations.

Dynamic QoS control module 404 limits queue depth for low latency streams, and also determines a minimum queue depth for fast read latency.

Bandwidth allocation manager 406 receives requests to reserve a relative percentage of the available bandwidth for each of the queues. It should not exceed 100% for write or read. It is possible that SLAs will not be met based on traffic mixes.

Explicit bandwidth allocation provides fixed allocation across the queues. Errors are reported via QoS measurement block 402. It is up to higher levels of the storage system 400 to adjust bandwidth allocations for the data streams if the QoS requirement is not met and it matters. If it is important to meet specific QoS metrics, the explicit allocation method is used. For QoS to meet the SLAs, an adequate margin is required.

Proportional bandwidth allocation is used if a system only needs relative SLAs across the data streams and it is desirable to maximize overall total performance. In this case, the SLA for each stream is set at the beginning. The SLAs can be absolute values or percentage of the total bandwidth.

During operation, the dynamic QoS control module 404 monitors the warnings from the QoS monitor 402. If there are warnings, it adjusts down the total bandwidth of the offending set of streams (write or read). It also maintains their relative bandwidth. If there are no warnings over a specified time period, it adjusts the bandwidth up.

Some hysteresis is applied that stops the adjustments when the warnings are reduced to a specified number over a specified time. The time period for adjustment is also programmable to ensure that adjustments settle. This is a control loop.

All of these provisioning commands, performance metrics and parameters, and performance data may be saved within storage array 410, or any other memory within storage controller 400, or may be stored external to the controller 400 using an API or user interface.

In summary, the total bandwidth for drive storage media is divided up and/or allocated according to (1) user streams (2) internal management streams (i.e. housekeeping, garbage collection, integrity checking, etc.). Each stream is placed into individual read and write queues 430-452 for servicing according to QoS/SLA levels using a token scheme. Each user data stream also may have an associated partition on the storage media. Each internal management stream can affect all partitions.

Stream router/arbiter 408 manages queue servicing read/writes to storage media 230. Arbiter 408 also manages streams with respect to total available bandwidth of the media or media interfaces. The global erase queue 452 is also managed by router/arbiter 408. In some embodiments, bandwidth allocation manager 406 reads in a configuration file stored on storage media or configuration information received over an API or user interface.

QoS measurement module 402 monitors and/or audits real latency or bandwidth performance of drive and makes corrections and/or adjustments as necessary to align latency or bandwidth performance with configuration parameters.

In a first mode having fixed QoS levels, target QoS's are absolute values. QoS measurement module 402 generates alerts/warnings to host if latency or bandwidth performance violations are encountered.

In a second mode having dynamic QoS levels, target QoS's are percentage latency or bandwidth allocations and/or targets, then QoS measurement module 402 can dynamically adjust to meet the percentage target.

To meet latency targets, the storage system might have to service certain queues to guarantee latency or use a faster partition layout. Also, targets can be specified in various ways: (1) "lowest latency" (2) less than 'x' milliseconds latency (3) latency of 'x to y' milliseconds range, and the like.

Figure 5:
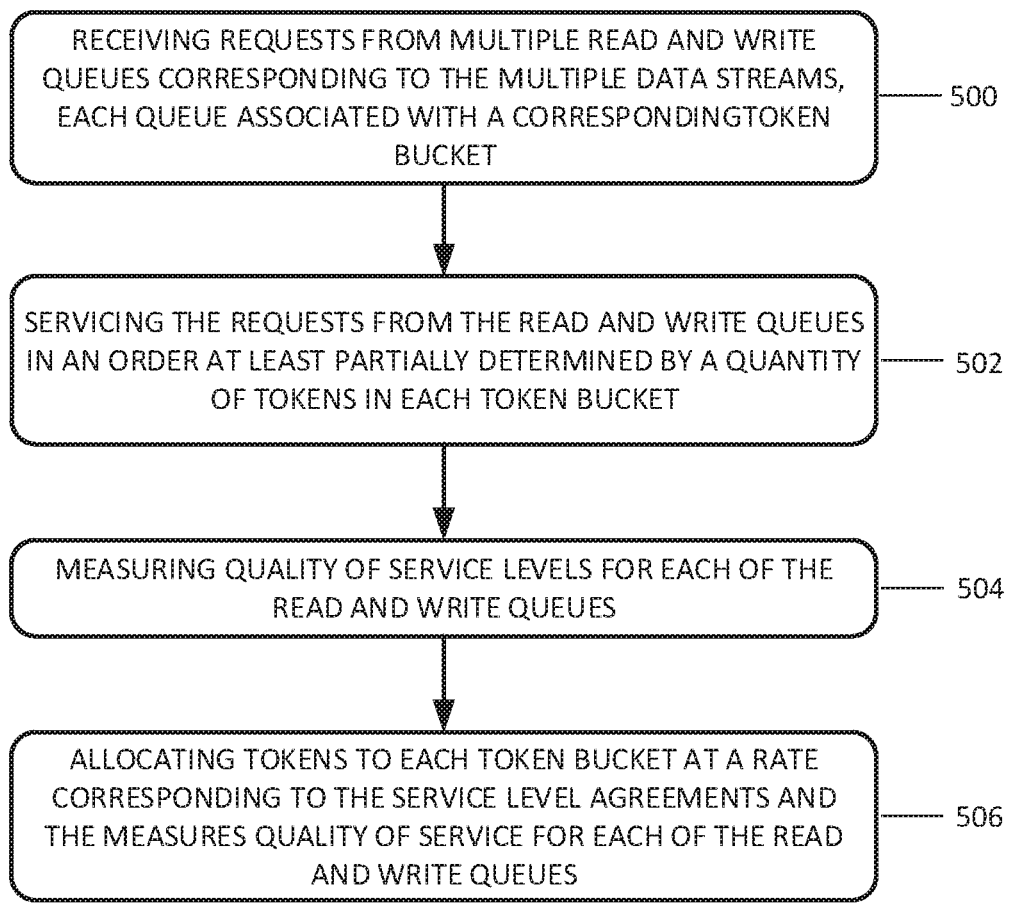
FIG. 5 illustrates a method for operating a storage controller.

FIG. 5 illustrates a method for operating a storage controller 210. In this example embodiment, storage controller 210 is configured to receive and transmit multiple data streams, each data stream having a corresponding service level agreement measured by a corresponding quality of service.

Arbiter 340 is configured to receive requests from multiple read and write queues 430-452 corresponding to the multiple data streams, where each queue is associated with a corresponding token bucket, (operation 500). Arbiter 340 services the requests from the read and write queues 430-452 in an order at least partially determined by a quantity of tokens in each token bucket, (operation 502).

Quality of service measurement module 402 measures quality of service levels for each of the read and write queues, (operation 504). Bandwidth allocation manager 406 allocates tokens to each token bucket at a rate corresponding to the service level agreements and the measurements of quality of service for each of the read and write queues, (operation 506).

Figure 6:
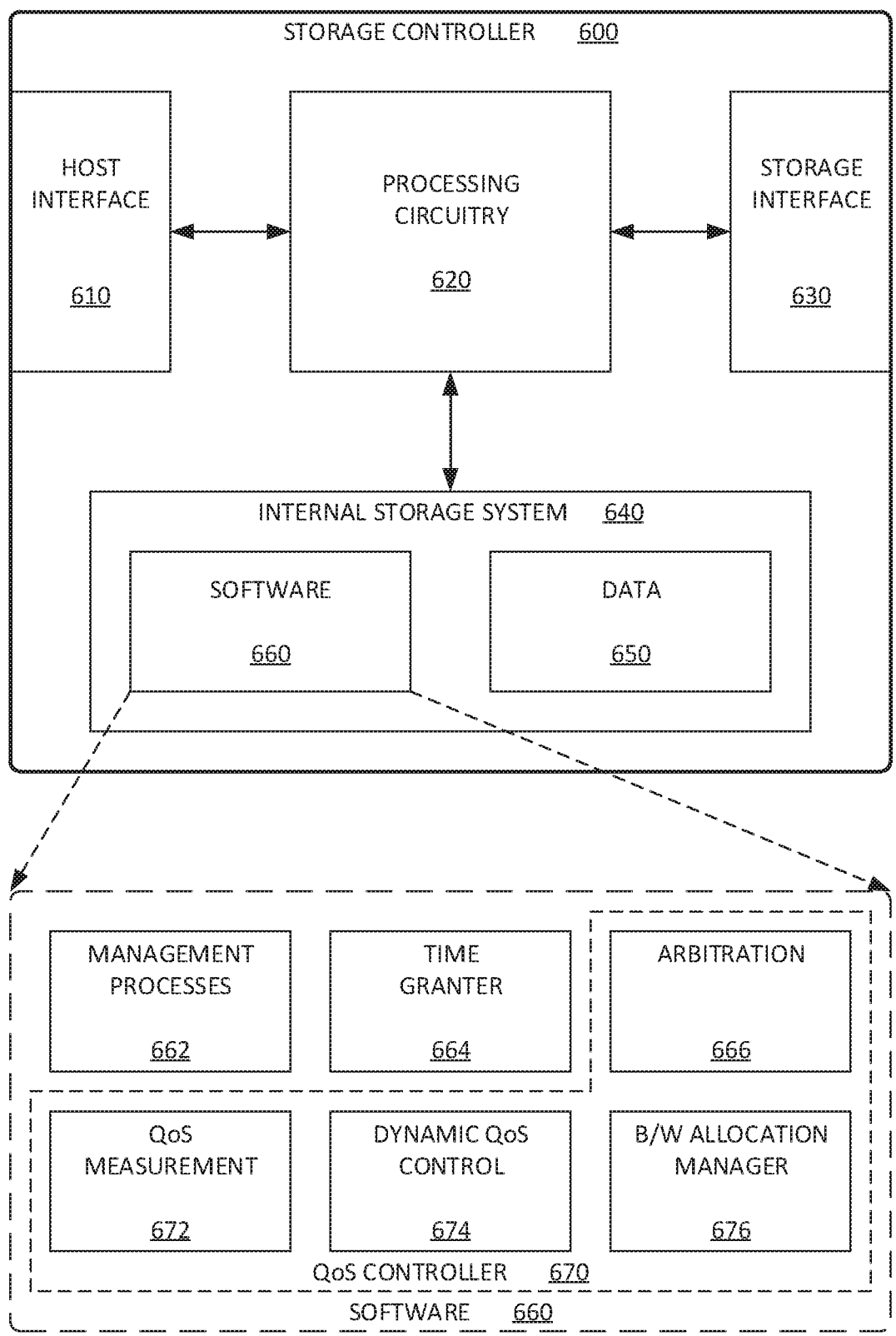
FIG. 6 illustrates a storage controller.

FIG. 6 illustrates storage controller 600. As discussed above, storage controller 600 may take on any of a wide variety of configurations. Here, an example configuration is provided for a storage controller implemented as an ASIC. However, in other examples, storage controller 600 may be built into a storage system or storage array, or into a host system.

In this example embodiment, storage controller 600 comprises host interface 610, processing circuitry 620, storage interface 630, and internal storage system 640. Host interface 610 comprises circuitry configured to receive data and commands from external host systems and to send data to the host systems. Storage interface 630 comprises circuitry configured to send data and commands to storage media and to receive data from the storage media.

Processing circuitry 620 comprises electronic circuitry configured to perform the tasks of a storage controller as described above. Processing circuitry 620 may comprise microprocessors and other circuitry that retrieves and executes software 660. Processing circuitry 620 may be embedded in a storage system in some embodiments. Examples of processing circuitry 620 include general purpose central processing units, application specific processors, and logic devices, as well as any other type of processing device, combinations, or variations thereof. Processing circuitry 620 can be implemented within a single processing device but can also be distributed across multiple processing devices or sub-systems that cooperate in executing program instructions.

Internal storage system 640 can comprise any non-transitory computer readable storage media capable of storing software 660 that is executable by processing circuitry 620. Internal storage system 640 can also include various data structures 650 which comprise one or more databases, tables, lists, or other data structures. Storage system 640 can include volatile and nonvolatile, removable and non-removable media implemented in any method or technology for storage of information, such as computer readable instructions, data structures, program modules, or other data.

Storage system 640 can be implemented as a single storage device but can also be implemented across multiple storage devices or sub-systems co-located or distributed relative to each other. Storage system 640 can comprise additional elements, such as a controller, capable of communicating with processing circuitry 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 660 can be implemented in program instructions and among other functions can, when executed by storage controller 600 in general or processing circuitry 620 in particular, direct storage controller 600, or processing circuitry 620, to operate as described herein for a storage controller. Software 660 can include additional processes, programs, or components, such as operating system software, database software, or application software. Software 660 can also comprise firmware or some other form of machine-readable processing instructions executable by elements of processing circuitry 620.

In at least one implementation, the program instructions can include management processes module 662, time granter module 664, arbitration module 666, QoS measurement module 672, dynamic QoS control module 674, and bandwidth allocation manager module 676. QoS controller 670 is comprised of arbitration module 666, QoS measurement module 672, dynamic QoS control module 674, and bandwidth allocation manager module 676.

Management processes module 662 includes instructions for performing storage media maintenance and overhead processes. Time granter module 664 in conjunction with bandwidth allocation manager module 626 dispenses tokens to the various token buckets associated with the read and write queues. Arbitration module 666 services requests from the read and write queues based at least in part on a quantity of tokens contained within the token bucket from the requesting queue. Quality of service measurement module 672 monitors the quality of service provided to each of the read and write queues and issues warnings when the quality of service drops below that required by the associated service level agreements. Dynamic quality of service control module 672 receives provisioning commands 456 and if sufficient bandwidth is available creates a new partition within the storage media and new read and write queues for the requested data stream.

In general, software 660 can, when loaded into processing circuitry 620 and executed, transform processing circuitry 620 overall from a general-purpose computing system into a special-purpose computing system customized to operate as described herein for a storage controller, among other operations. Encoding software 660 on internal storage system 640 can transform the physical structure of internal storage system 640. The specific transformation of the physical structure can depend on various factors in different implementations of this description. Examples of such factors can include, but are not limited to, the technology used to implement the storage media of internal storage system 640 and whether the computer-storage media are characterized as primary or secondary storage.

For example, if the computer-storage media are implemented as semiconductor-based memory, software 660 can transform the physical state of the semiconductor memory when the program is encoded therein. For example, software 660 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a storage controller within a storage system comprising a single storage controller, configured to receive and transmit multiple data streams, each data stream having a corresponding service level agreement measured by a corresponding quality of service, the method comprising:
receiving requests from multiple read and write queues corresponding to the multiple data streams, each queue associated with a corresponding token bucket;
servicing the requests from the read and write queues in an order at least partially determined by a quantity of tokens in each token bucket;
measuring quality of service levels for each of the read and write queues; and
allocating tokens to each token bucket at a rate corresponding to the service level agreements and the measured quality of service for each of the read and write queues.

2. The method of claim 1, wherein a maximum quantity of tokens allowed in each token bucket is determined in part by a corresponding service level agreement.

3. The method of claim 1, the method further comprising:
receiving requests from internal process queues; and
servicing the internal process queues along with the read and write queues.

4. The method of claim 3, wherein the internal process queues have a guaranteed percentage of all available bandwidth.

5. The method of claim 1, the method further comprising:
determining an amount of time required for each request; and
servicing the request only if the quantity of tokens in the corresponding token bucket is sufficient to fulfill the request.

6. The method of claim 1, the method further comprising:
receiving a request for a new data stream;
responsive to the request for a new data stream, determining an amount of available bandwidth; and
establishing the new data stream only if the bandwidth required by the new data stream is less than the amount of available bandwidth.

7. The method of claim 1, wherein each data stream corresponds to a partition in the storage media.

8. The method of claim 1, the method further comprising:
adjusting the rate tokens are allocated to each token bucket in response to the measured quality of service for each of the read and write queues.

9. The method of claim 1, wherein the quality of service includes read bandwidth, read latency, write bandwidth, and write latency requirements.

10. The method of claim 1, the method further comprising:
issuing warnings when service levels any of the read and write queues fail to meet corresponding quality of service requirements.

11. A storage system comprising a single storage controller, the storage controller comprising:
a host interface, configured to receive and transmit multiple data streams, each data stream having a corresponding service level agreement measured by a corresponding quality of service;
a drive interface, configured to transmit the data streams to storage media; and
a quality of service control module coupled with the host interface and the drive interface, including:
a read queue for each of the data streams, each read queue associated with a corresponding token bucket;
a write queue for each of the data streams, each write queue associated with a corresponding token bucket;
an arbiter, configured to receive requests from the read and write queues, and to service the read and write queues in an order at least partially determined by a quantity of tokens in each token bucket;
a quality of service measurement module, configured to measure quality of service levels for each of the read and write queues; and
a bandwidth allocation manager, configured to allocate tokens to each token bucket at a rate corresponding to the service level agreements and the measured quality of service for each of the read and write queues.

12. The storage system of claim 11, wherein a maximum quantity of tokens allowed in each token bucket is determined in part by a corresponding service level agreement.

13. The storage system of claim 11, wherein the arbiter is further configured to receive requests from internal process queues and to service the internal process queues along with the read and write queues.

14. The storage system of claim 13, wherein the internal process queues have a guaranteed percentage of all available bandwidth.

15. The storage system of claim 11, wherein the arbiter is further configured to determine an amount of time required for each request, and to service the request only if the quantity of tokens in the corresponding token bucket is sufficient to fulfill the request.

16. The storage system of claim 11, wherein the quality of service control module further includes a dynamic quality of service control module configured to receive a request for a new data stream, and responsive to the request for a new data stream, determine an amount of available bandwidth, and establish the new data stream only if the bandwidth required by the new data stream is less than the amount of available bandwidth.

17. The storage system of claim 11, wherein each data stream corresponds to a partition in the storage media.

18. The storage system of claim 11, wherein the bandwidth allocation manager is further configured to adjust the rate tokens are allocated to each token bucket in response to the measured quality of service for each of the read and write queues.

19. The storage system of claim 11, wherein the quality of service includes read bandwidth, read latency, write bandwidth, and write latency requirements.

20. The storage system of claim 11, wherein the quality of service measurement module is further configured to issue warnings when service levels any of the read and write queues fail to meet corresponding quality of service requirements.

* * * * *